United States Patent Office 3,544,632
Patented Dec. 1, 1970

3,544,632
PRODUCTION OF ALKANOLAMINES-(1,2) OR CYCLOALKANOLAMINES-(1,2)
Erich Haarer and Hubert Corr, Ludwigshafen (Rhine), and Siegfried Winderl, Heidelberg, Germany, assignors to Badische Anilin- & Soda-Fabrik Aktiengesellschaft, Ludwigshafen (Rhine), Germany
No Drawing. Filed Apr. 10, 1968, Ser. No. 720,352
Claims priority, application Germany, Apr. 13, 1967, 1,593,774
Int. Cl. C07c 85/00
U.S. Cl. 260—563
13 Claims

ABSTRACT OF THE DISCLOSURE

An improved process for the production of alkanolamines-(1,2) or cycloalkanolamines-(1,2) by reaction of alkylene oxides or cycloalkylene oxides with ammonia or primary or secondary amines at elevated temperature in the presence of water, the improvement comprising carrying out the reaction in the presence of a solid inert large-surfaced substance. The alkanolamines and cycloalkanolamines prepared are suitable for the production of surfactants.

---

The present invention relates to an improved process for the production of alkanolamines-(1,2) and cycloalkanolamines-(1,2) by reaction of alkylene oxides and cycloalkylene oxides with ammonia or amines.

It is known from Houben-Weyl, Methoden der organischen Chemie, 11/1, 311 (1957), that ethanolamines are obtained by reaction of ethylene oxide with anhydrous ammonia. The reaction proceeds very slowly with anhydrous ammonia. If small amounts of water are present, however, the reaction may proceed explosively. According to another method described on the same page of the same book, ethanolamines are obtained by passing ethylene oxide into 20 to 30% aqueous solutions of ammonia or amines. This method has the disadvantage that large amounts of water have then to be removed from the reaction product. Another disadvantage of the method, mentioned on page 314 (loc. cit.) is that higher 1,2-epoxides will only react at high temperatures, for example above 100° C.

It is an object of this invention to provide an improved process for the production of alkanolamines and cycloalkanolamines in which the reaction proceeds uniformly. It is a further object of the invention to provide an improved process in which only small amounts of water are required which can be easily removed from the reaction product. Another object of the invention is to provide an improved process in which the alkylene oxides or cycloalkylene oxides used as starting materials are reacted quantitatively. It is a further object of the invention to provide an improved process in which higher alkylene oxides or higher cycloalkylene oxides can be reacted at relatively low temperatures.

In accordance with this invention these and other objects and advantages are achieved in an improved process for the production of alkanolamines-(1,2) or cycloalkanolamines-(1,2) by reaction of alkylene oxides or cycloalkylene oxides with ammonia, primary amines or secondary amines at elevated temperature in the presence of water wherein the improvement comprises carrying out the reaction in the presence of a solid inert substance having a large surface area.

Alkanolamines-(1,2) and cycloalkanolamines-(1,2) include monoalkanolamines, dialkanolamines, monocycloalkanolamines-(1,2), dicycloalkanolamines-(1,2) and tricycloalkanolamines-(1,2). They are formed side by side in the reaction with ammonia. If the reaction be carried out with primary amines, the product may be monoalkanolamines, dialkanolamines or cycloalkanolamines-(1,2). When secondary amines are used on the other hand, only the formation of monoalkanolamines and cycloalkanolamines-(1,2) is possible.

Preferred alkylene oxides have two to twelve carbon atoms, particularly two to eight carbon atoms and one epoxide group in the molecule. Apart from the epoxide group, the preferred alkylene oxides have hydrocarbon structure. They may, like styrene oxide, have a phenyl group as a substituent. Ethylene oxide and propylene oxide are particularly preferred because of their ready industrial accessibility. Preferred cycloalkylene oxides have five to twelve, particularly six to eight, carbon atoms and one epoxide group in the molecule. Apart from the epoxide group, the preferred cycloalkylene oxides have saturated hydrocarbon structure. Examples of suitable starting materials are ethylene oxide, propylene oxide, isobutylene oxide, styrene oxide, hexylene oxide-(1), octylene oxide-(1), cyclohexene oxide, cyclooctene oxide, cyclododecene oxide and butadiene monoxide.

Preferred primary or secondary amines have, as substitutents, alkyl, cycloalkyl, aralkyl or aryl radicals having up to twenty carbon atoms, particularly up to 17 carbon atoms. Apart from the amino group, the preferred primary or secondary amines have hydrocarbon structure. Primary or secondary amines which have alkyl groups having up to twenty carbon atoms as substituents are particularly preferred. Examples of suitable amines are: methylamine, butylamine, decylamine, stearylamine, diethylamine, dibutylamine, methylstearylamine, cyclohexylamine, cyclooctylamine, benzylamine, aniline or naphthylamine. Heterocyclic amines such as piperidine, pyrrolidine, morpholine and piperazine are also suitable amines.

It is advantageous to use 0.5 to 30 moles, particularly 3 to 20 moles, of ammonia, primary amine or secondary amine for each mole of alkylene oxide or cycloalkylene oxide. The amount of ammonia, primary amine or secondary amine used also depends on whether primary, secondary or tertiary amines are to be prepared as products of the process. The reaction is carried out in the presence of water. It has proved to be advantageous to use 1 to 20% by weight of water with reference to the alkylene oxide or cycloalkylene oxide used. Particularly favorable results are achieved when 5 to 10% by weight of water is used.

It is advantageous to carry out the reaction at temperatures of 10° to 150° C. It is preferable to use temperatures of from 70° to 120° C. The reaction may be carried out at atmospheric pressure in the vapor phase. It is preferred however to carry out the reaction to the liquid phase at a pressure of up to 300 atmospheres, particularly from 10 to 250 atmospheres.

The reaction proceeds in the presence of a solid inert substance having a large surface area. Inert substances are defined as those which do not take part in the reaction and do not change the reactants or reaction products. Examples of suitable solid inert substances are those used as carriers for catalysts, such as aluminum oxide, silicates, coke, active, carbon, silica gel, diatomaceous earth, magnesium oxide, zinc oxide, rutile and pumice. The inert substances advantageously have a mean pore size of 20 to 10,000 A. Another characteristic feature of the inert substances is their internal surface area. They have advantageously an internal surface area of 0.1 to 1,200 m.$^2$ per gram, particularly 1 to 1,000 m.$^2$/g.

The process according to the invention may be carried out for example by passing the alkylene oxide or cycloalkylene oxide, ammonia, primary or secondary amine and water in the said ratio in the vapor phase at the stated temperature through a tube in which the said inert substance is stationarily arranged. According to another method alkylene oxide or cycloalkylene oxide, ammonia, primary or secondary amine and water are supplied in the liquid phase to the top of a high pressure tube in which the said inert substance is stationarily arranged. The said temperature and pressure conditions are maintained in the high pressure tube during the reaction. The alkanolamine or cycloalkanolamine - (1,2) is isolated from the resultant reaction solution by fractional distillation.

The alkanolamines and cycloalkanolamines-(1,2) obtained by the process according to the invention are suitable for the production of surfactants (cf. Ullman's Enzyklopädie der technischen Chemie, volume 3, page 102).

The invention is further illustrated by the following examples in which parts are parts by weight unless otherwise stated. They bear the same relation to parts by volume as the kilogram to the liter.

EXAMPLE 1

A mixture of 50 parts of 90% by weight aqueous propylene oxide and 500 parts by volume of liquid ammonia per hours is metered continuously into a high pressure tube having a capacity of 500 parts by volume which is filled with alumina which has a mean pore size of 60 A. and an internal surface area of 250 m.$^2$/g. The high pressure tube is kept at a temperature of 120° C. The pressure is adjusted to 100 atmospheres gauge with nitrogen. The residence time is about half an hour. Water and ammonia are distilled off from the reaction product. 53 parts per hour of a mixture containing 67% by weight of isopropanolamine, 20.5% by weight of diisopropylamine and 8.6% by weight of triisopropanolamine is obtained.

If the high pressure tube is filled with glass beads and the experiment is carried out otherwise in the same way, only 36 parts per hour of a mixture of the said amines is obtained.

EXAMPLE 2

The high pressure tube used in Example 1 is filled with diatomaceous earth having a mean pore size of 1,500 A. and an internal surface area of 12 m.$^2$/g. and the reaction is carried out as described in Example 1. 53 parts per hour of a mixture containing 69.3% by weight of isopropanolamine, 17.9% by weight of diisopropanolamine and 11.2% by weight of triisopropanolamine is obtained.

EXAMPLE 3

The high pressure tube used in Example 1 is filled with pumice having a mean pore size of 6,900 A. and an internal surface area of 0.7 m.$^2$/g. and the reaction is carried out as described in Example 1. 51 parts per hour of a mixture containing 65.2% by weight of isopropanolamine, 18.6% by weight of diisopropanolamine and 10.3% by weight of triisopropanolamine is obtained.

We claim:

1. In a process for the production of alkanolamines or cycloalkanolamines-(1,2) by reacting (A) an organic oxide selected from the group consisting of alkylene oxides of two to twelve carbon atoms, cycloalkylene oxides of five to twelve carbon atoms and styrene oxide with (B) a compound selected from the group consisting of ammonia, primary and secondary alkylamines of up to twenty carbon atoms, cyclohexylamine and cyclooctylamine in a molar ratio of (A):(B) of from 1:0.5 to 1:30 at an elevated temperature and in the presence of water, the improvement which comprises carrying out the reaction at a temperature of 10° to 150° C. in the presence of 1 to 20% by weight of water with reference to the organic oxide and in the presence of a porous solid inert substance having a mean pore size of 20 to 10,000 A. and having an internal surface area of from 0.1 to 1,200 m.$^2$/g.

2. A process as claimed in claim 1 wherein reactant (B) is ammonia.

3. A process as claimed in claim 1 in which reactant (A) is an alkylene oxide of two to eight carbon atoms.

4. A process as claimed in claim 1 in which reactant (A) is a compound selected from the group consisting of ethylene oxide and propylene oxide.

5. A process as claimed in claim 1 in which reactant (A) is propylene oxide.

6. A process as claimed in claim 5 in which reactant (B) is ammonia.

7. A process as claimed in claim 1 in which reactant (A) is a cycloalkylene oxide of six to eight carbon atoms.

8. A process as claimed in claim 1 in which reactant (B) is a primary alkylamine of up to twenty carbon atoms.

9. A process as claimed in claim 1 in which reactant (B) is a secondary amine of up to twenty carbon atoms.

10. A process as claimed in claim 1 in which 3 to 20 moles of reactant (B) is used for each mole of reactant (A).

11. A process as claimed in claim 1 in which 5 to 10% by weight of water is used with reference to the organic oxide.

12. A process as claimed in claim1 which is carried out at a temperature of from 70° to 120° C.

13. A process as claimed in claim 1 which is carried out at a temperature of up to 300 atmospheres.

References Cited

UNITED STATES PATENTS 3,328,467  6/1967  Hamilton _____ 260—584 XR

FOREIGN PATENTS 710,861  6/1954  Great Britain.
760,215  10/1956  Great Britain.

OTHER REFERENCES

Malinovsky et al.: "Chem. Abstracts; vol. 47 (1953) p. 2694.

Molinovsky et al.: "Chem. Abstracts," vol. 47 (1953) p. 9282.

Hauben-Weyl, "Met der Org. Chemie," vol. 11 (1957) pp. 311–314.

CHARLES B. PARKER, Primary Examiner

D. R. PHILLIPS, Assistant Examiner

U.S. Cl. X.R.

260—247.7, 268, 294.7, 326.8, 570.7, 577, 584